United States Patent
Leonard et al.

(10) Patent No.: US 10,280,674 B2
(45) Date of Patent: May 7, 2019

(54) ELECTROMECHANICAL STRUT WITH ELECTROMECHANICAL BRAKE AND METHOD OF ALLOWING AND PREVENTING MOVEMENT OF A CLOSURE MEMBER OF A VEHICLE

(71) Applicant: Magna Closures Inc., Newmarket (CA)

(72) Inventors: Jube Leonard, Barrie (CA); Borys M. Shchokin, Thornhill (CA); Joseph Scheuring, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 15/131,826

(22) Filed: Apr. 18, 2016

(65) Prior Publication Data

US 2016/0312514 A1    Oct. 27, 2016

Related U.S. Application Data

(60) Provisional application No. 62/152,256, filed on Apr. 24, 2015.

(51) Int. Cl.
| | |
|---|---|
| *E05F 15/622* | (2015.01) |
| *E05F 3/00* | (2006.01) |
| *E05F 1/10* | (2006.01) |
| *F16H 25/24* | (2006.01) |
| *F16H 25/20* | (2006.01) |

(52) U.S. Cl.
CPC .......... *E05F 15/622* (2015.01); *E05F 1/1041* (2013.01); *E05F 3/00* (2013.01); *F16H 25/2454* (2013.01); *E05Y 2201/21* (2013.01); *E05Y 2201/216* (2013.01); *E05Y 2201/246* (2013.01); *E05Y 2201/434* (2013.01); *E05Y 2201/462* (2013.01); *E05Y 2900/532* (2013.01); *F16H 2025/2075* (2013.01); *F16H 2025/2087* (2013.01); *F16H 2025/2463* (2013.01)

(58) Field of Classification Search
CPC ....................................................... E05F 3/16
See application file for complete search history.

(56) References Cited

U.S. PATENT DOCUMENTS

| | | | | |
|---|---|---|---|---|
| 3,749,955 | A * | 7/1973 | Fetzer ................... | D01H 7/2283 310/77 |
| 4,938,387 | A * | 7/1990 | Kervefors ............ | B67D 1/0016 141/376 |

(Continued)

*Primary Examiner* — Catherine A Kelly
(74) *Attorney, Agent, or Firm* — Dickinson Wright PLLC

(57) ABSTRACT

An electromechanical strut and method of moving a closure member of a vehicle between an open position and a closed position is provided. The electromechanical strut includes a power drive unit including a motor, a leadscrew, a planetary gearset operably connecting the motor to the leadscrew, and an electromechanical brake assembly. The electromechanical strut further includes a telescoping unit including an extensible tube and a drive nut for converting rotary motion of the leadscrew into linear motion of the telescoping unit. The electromechanical brake assembly is selectively moveable between an engaged state, wherein the leadscrew is prevented from rotating to prevent relative axial movement between the power drive unit and the telescoping unit, and a disengaged state, wherein the leadscrew is permitted to rotate to allow relative axial movement between the power drive unit and the telescoping unit.

23 Claims, 6 Drawing Sheets

(56) References Cited

U.S. PATENT DOCUMENTS

| | | |
|---|---|---|
| 6,516,567 B1 | 2/2003 | Stone et al. |
| 7,234,757 B2 | 6/2007 | Mitchell |
| 7,547,058 B2 | 6/2009 | King et al. |
| 7,566,092 B2 | 7/2009 | Paton et al. |
| 7,648,189 B2 | 1/2010 | Porat et al. |
| 7,938,473 B2 | 5/2011 | Paton et al. |
| 8,042,301 B2 | 10/2011 | Ritter |
| 8,109,163 B2 * | 2/2012 | Hudson ............... B64C 13/28 74/89.25 |
| 8,403,397 B2 | 3/2013 | Adams et al. |
| 2003/0136626 A1 | 7/2003 | Ciaramitaro et al. |
| 2004/0084265 A1 | 5/2004 | Muller et al. |
| 2007/0175099 A1 | 8/2007 | Kachouh |
| 2007/0179006 A1 * | 8/2007 | Kachouh ............. E05F 15/622 475/154 |
| 2007/0296243 A1 * | 12/2007 | Borrmann ........... E05F 15/622 296/146.4 |
| 2011/0067961 A1 * | 3/2011 | Duits ................... F16D 63/006 188/82.84 |
| 2011/0302841 A1 | 12/2011 | Ye et al. |
| 2012/0000304 A1 | 1/2012 | Hamminga et al. |
| 2012/0098368 A1 * | 4/2012 | Xiong .................... H02K 7/06 310/77 |
| 2014/0173988 A1 | 6/2014 | Bochen et al. |
| 2015/0211279 A1 * | 7/2015 | Suzuki .................. H02K 7/10 16/65 |
| 2016/0312517 A1 * | 10/2016 | Elie ....................... E05F 15/73 |

* cited by examiner

# ELECTROMECHANICAL STRUT WITH ELECTROMECHANICAL BRAKE AND METHOD OF ALLOWING AND PREVENTING MOVEMENT OF A CLOSURE MEMBER OF A VEHICLE

CROSS-REFERENCE TO RELATED APPLICATION

This application claims the benefit of U.S. Provisional Application Ser. No. 62/152,256, filed Apr. 24, 2015, which is incorporated herein by reference in its entirety.

FIELD OF THE INVENTION

The present disclosure relates generally to an electromechanical strut for opening and closing an automotive closure member, and more particularly to an electromechanical strut including a motor operably coupled to drive a leadscrew and having an electromechanical brake that facilitates maintaining the leadscrew in a releasably fixed position.

BACKGROUND OF THE INVENTION

This section provides background information which is not necessarily prior art to the inventive concepts associated with the present disclosure.

Automotive closure members, for example lift gates and side doors, provide a convenient access to the interior areas of a vehicle, for example to the cargo areas of hatchbacks, wagons, and other utility vehicles. Typically, a lift gate or side door is hand operated, requiring manual effort to move the lift gate or door between the open and the closed positions. Depending on the size and weight of the lift gate or door, this effort can be difficult for some users. Additionally, manually opening or closing a lift gate or side door can be inconvenient, particularly when the user's hands are full.

Attempts have been made to reduce the effort and inconvenience of opening and closing a lift gate or side door. One solution for a lift gate is to pivotally mount gas struts, also referred to as spindles, to both the vehicle body and the lift gate, reducing the force required for opening the lift gate. However, the gas struts also hinder efforts to close the lift gate, as the struts re-pressurize upon closing, increasing the effort required. Additionally, the efficacies of the gas struts vary according to the ambient temperature. Furthermore, the use of gas struts still requires that the lift gate is manually opened and closed.

Automated power closure systems used to open and close vehicle lift gates are well known in the art and typically include a power actuator that is operable to apply a force directly to the lift gate to enable opening and closing thereof. For example, U.S. Pat. No. 6,516,567 discloses a power actuator that works in tandem with a gas strut. The power actuator comprises a motor mounted within the vehicle body that is coupled to a flexible rotary cable by a clutch. The flexible rotary cable drives an extensible strut that is pivotally mounted to both the vehicle body and the lift gate. Thus, the motor can raise and lower the lift gate conveniently without manual effort. A controller unit operable to engage and disengage the motor can be connected to a remote key fob button or a button in the passenger compartment, providing additional convenience. However, this type of power actuator is not without its disadvantages. Specifically, the power actuator is comprised of multiple parts, each of which needs to be assembled and mounted to the vehicle separately, increasing costs. The vehicle body must be specifically designed to provide a space to house the motor. Due to the limited space available, the motor is small and requires the assistance of the gas strut. Additionally, because the power actuator is designed to work in tandem with a gas strut, the gas strut can still vary in efficacy due to temperature. Thus, the motor provided must be balanced to provide the correct amount of power with varying degrees of mechanical assistance from the gas strut.

U.S. Publication No. US 2004/0084265 provides various examples of power actuators working in tandem with gas struts and several alternative examples of electromechanical power actuators. These electromechanical power actuators include an electric motor and reduction gearset coupled via a flexible rotary cable to a second gearset which, in turn, is coupled via a slip clutch to a rotatable piston rod. Rotation of the piston rod causes a spindle drive mechanism to translate an extensible strut that is adapted to be pivotally mounted to one of the vehicle body and the lift gate. The slip clutch functions to permit the piston rod to rotate relative to the gearset when a torque exceeding its preload is exerted on the lift gate so as to accommodate manual operation of the lift gate without damaging the electromechanical power actuator. More specifically, the slip clutch releasably couples the gearset to the piston rod whereby, during normal operation, powered opening and closing of the lift gate is provided. However, when a high level force is applied to the extensible strut, which attempts to back drive the spindle drive mechanism in response to excessive or abusive manual operation of the lift gate, the slip clutch momentarily releases the drive connection between the piston rod and the gearset to avoid mechanical damage to the system. A helical compression spring is installed in the power actuator to provide a counter balancing force against the weight of the lift gate, which in turn increases the size and weight of the assembly.

U.S. Publication No. US2012/0000304 discloses several embodiments of power drive mechanisms for moving trunk lids and lift gates between open and closed positions. The power drive mechanisms have an offset configuration employing an electric motor-driven worm gearset to rotate an externally-threaded jackscrew for translating an extensible strut. A slip clutch is disposed between an output gear of the worm gearset and the rotatable jackscrew. In addition, a coupler unit is provided between the motor output shaft and the worm of the worm gearset. The coupler unit includes a first coupler member fixed for rotation with the worm shaft, a second coupler member fixed for rotation with the motor output shaft, and a resilient spider interdigitated between fingers extending from the first and second coupler members. The resilient coupler provides axial and circumferential isolation between the first and second coupler members and functions to absorb transient or torsional shock loads between the motor shaft and the worm shaft.

While currently known electromechanical drive mechanisms perform satisfactorily for their intended purpose, improved devices for opening and closing automotive closure members, such as lift gates and side doors, are desired.

SUMMARY OF THE INVENTION

This section provides a general summary of the disclosure and is not a comprehensive disclosure of its full scope or all of its features, aspects or objectives.

It is an aspect of the present disclosure to provide an improved electromechanical strut for use in a powered closure system of a motor vehicle for controlling movement and braking of a closure member between an open position and a closed position.

It is a related aspect of the present disclosure to provide an improved electromechanical strut for use in a controlling movement and braking of a power lift gate system or side door system of a motor vehicle.

It is a further aspect of the present disclosure to provide such an electromechanical strut including a motor arranged in operable connection with a gear box and a leadscrew to drive the gear box and lead screw, with the strut further including an electromechanical brake to selectively prevent the lead screw from being driven to maintain the leadscrew in a releasably fixed position.

The electromechanical brake of the strut includes a first friction plate operably coupled to a shaft of the motor for conjoint rotation therewith; a second friction plate, a spring member and an electric coil. The brake has a normal "on position," wherein the coil spring biases the second friction plate into contact with the first friction plate, such that the second friction plate prevents the first friction plate and motor shaft from rotating, which in turn prevents movement of the gearbox and leadscrew. Accordingly, by holding the leadscrew in a fixed position, the electromechanical brake, while in the "on position," prevents movement of the associated vehicle closure member.

To move the leadscrew from a fixed position to a new position, for example, to at least partially open or close the lift gate or side door, the electric coil is energized to create a magnetic field. The magnetic force pulls the second friction plate out of contact with the first friction plate. The motor is also energized, such that the first friction plate and motor shaft rotate to drive the gear box and thus the leadscrew to the new position.

Further aspects of the present disclosure include a method of manufacturing the electromechanical strut; and a method of opening, closing, and maintaining the vehicle closure member in a fixed position using the electromechanical strut.

In accordance with one aspect of the invention, an electromechanical strut for moving a closure member of a vehicle between an open position and a closed position includes a power drive unit operably connected to one of the closure member and motor vehicle body. The power drive unit includes a housing having an inner surface bounding a cavity extending along a central axis between opposite first and second ends. A motor is fixed in the cavity, a leadscrew is disposed in the cavity, a planetary gearset operably connects a motor shaft of the motor to the leadscrew, and an electromechanical brake assembly is operably connected to the motor shaft. The electromechanical strut further includes a telescoping unit operably connected to the other of the closure member and the motor vehicle body. The telescoping unit includes an extensible tube at least partially received in the cavity of the housing, and further includes a drive nut for converting rotary motion of the leadscrew into linear motion of the telescoping unit to move the telescoping unit between a retracted position relative to the housing and an extended position relative to the housing. The electromechanical brake assembly is selectively moveable between an engaged state and a disengaged state. The motor shaft and the leadscrew are prevented from rotating when the electromechanical brake assembly is in the engaged state to prevent relative axial movement between the power drive unit and the telescoping unit. The motor shaft and the leadscrew are permitted to rotate when the electromechanical brake assembly is in the disengaged state to allow relative axial movement between the power drive unit and the telescoping unit.

In accordance with a further aspect of the invention, the electromechanical brake assembly has a coil assembly operably connected to a source of electrical current. The electromechanical brake assembly remains in the engaged state when the coil assembly is de-energized, by the absence of electrical current, and is selectively moved to the disengaged state when the coil assembly is selectively energized by electrical current.

In accordance with a further aspect of the invention, the electromechanical brake assembly includes a first friction plate and a second friction plate. The first and second friction plates are biased into frictional engagement with one another when the coil assembly is de-energized, and the first and second friction plates are moved out of frictional engagement with one another by a magnetic force emitted from the coil assembly when the coil assembly is selectively energized.

In accordance with a further aspect of the invention, the electromechanical brake assembly includes a spring member biasing the first and second friction plates into frictional engagement with one another when the coil assembly is de-energized, whereupon the force of the spring is overcome to allow the first and second friction plates to move out of frictional engagement with one another when the coil assembly is energized.

In accordance with a further aspect of the invention, the extensible tube of the telescoping unit is a single walled tube and does not include a counterbalance spring member.

In accordance with a further aspect of the invention, a method of allowing and preventing movement of a closure member of a vehicle between an open position and a closed position with an electromechanical strut is provided. The electromechanical strut having a power drive unit operably connected to one of the closure member and motor vehicle body, the power drive unit including a motor, a leadscrew, a planetary gearset operably connecting a motor shaft of the motor to the leadscrew, an electromechanical brake assembly operably connected to the motor shaft, and a telescoping unit operably connected to the other of the closure member and the motor vehicle body, the telescoping unit having an extensible tube and a drive nut for converting rotary motion of the leadscrew into linear motion of the telescoping unit to move the telescoping unit between a retracted position and an extended position. The method including selectively commanding the electromechanical brake assembly to move to an engaged state to prevent the motor shaft and the leadscrew from rotating and preventing relative axial movement between the power drive unit and the telescoping unit, and selectively commanding the electromechanical brake assembly to move to a disengaged state to allow the motor shaft and the leadscrew to rotate and allowing relative axial movement between the power drive unit and the telescoping unit.

In accordance with a further aspect of the invention, the method further includes de-energizing a coil assembly of the electromechanical brake assembly to maintain the electromechanical brake assembly in the engaged state and energizing the coil assembly of the electromechanical brake assembly with electric current to move the electromechanical brake assembly to the disengaged state.

In accordance with a further aspect of the invention, the method further includes biasing first and second friction plates of the electromechanical brake assembly into frictional engagement with one another when the coil assembly is de-energized and moving the first and second friction plates out of frictional engagement with one another by a magnetic force emitted from the coil assembly when the coil assembly is energized.

In accordance with a further aspect of the invention, the method further includes biasing the first and second friction plates of the electromechanical brake assembly into frictional engagement with one another with a spring member when the coil assembly is de-energized.

In accordance with a further aspect of the invention, the method further includes moving the second friction plate axially away from the first friction plate under the influence of the magnetic force upon selectively energizing the coil assembly via a command from an electronic control unit.

In accordance with a further aspect of the invention, the method can further include providing the extensible tube of the telescoping unit as a single tube not having a counterbalance spring member.

These and other alternative embodiments are directed to providing an electromechanical strut with enhanced operation, including additional holding force, in a compact arrangement for use in a powered closure system of a motor vehicle.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The invention will now be described, by way of example only, with reference to the attached Figures, wherein.

DETAILED DESCRIPTION OF THE INVENTION

Vehicles, particularly passenger vehicles, are equipped with moveable closure panels for providing openings, passages and access within and through defined portions of the vehicle body. To enhance operator convenience, many vehicles are now equipped with power-operated closure systems to automatically control movement of all types of closure panels including, without limitation, hatch lift gates, side doors, trunk and hood deck lids, sliding and hinged doors, sun roofs and the like. For purposes of descriptive clarity, the present disclosure is described herein in the context of a powered lift gate or side door. However, upon reading the following detailed description in conjunction with the appended drawings, it will be clear that the inventive concepts of the present disclosure can be applied to numerous other systems and applications, and thus, the specific embodiments described and shown herein are intended to be exemplary and not limiting.

In this regard, the present disclosure is generally directed to electromechanical struts having a power-operated drive mechanism comprised of a housing, an electric motor, a reduction gear-set driven by the electric motor, a rotatable power screw, a coupling device that is operably disposed between the gearset and the power screw, an extensible member that is linearly translatable relative to the housing.

Figure 1:
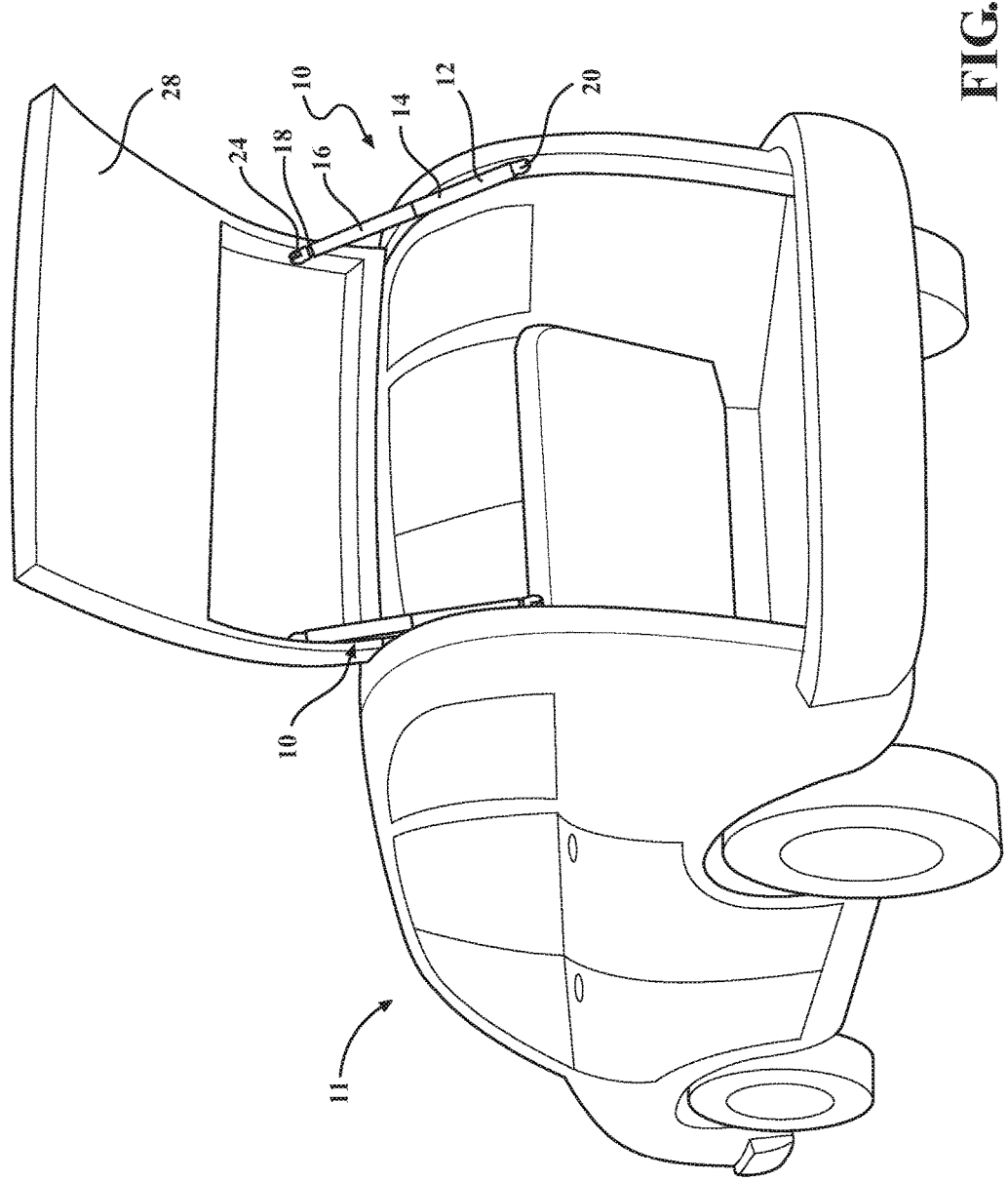
FIG. 1 is a perspective view of a motor vehicle having a closure system, shown as a powered lift gate, for example, equipped with at least one, and shown as a pair of electromechanical struts, at least one of which is constructed in accordance with the teachings of the present disclosure.

Referring now to FIG. 1, an embodiment of an electromechanical strut 10 is shown mounted to a motor vehicle 11. Electromechanical strut 10 includes a power drive unit 12 enveloped in an upper outer housing or tube, referred to hereafter simply as housing 14, and an extensible member, also referred to as telescoping unit 16 enveloped in an outer lower housing or tube, referred to hereafter simply as extensible tube 18. A first pivot mount 20, such as a 10 mm ball stud, by way of example and without limitation, fixed to a first end 22 of the strut 10, is pivotally mounted to a portion of the vehicle body adjacent an interior cargo area in the vehicle 11. A second pivot mount 24, such as a 10 mm ball stud, by way of example and without limitation, fixed to a second end 26 of the strut 10, is pivotally mounted to a lift gate 28 of the vehicle 11, by way of example and without limitation.

The electromechanical strut 10 provides improved operation in a compact, reduced weight arrangement, such as by having minimal number of components and a reduced outer diameter or cross-sectional area. The strut 10 includes a motor-gear assembly 30, which includes a motor 32, a gear box, also referred to as planetary gearset 34 and a power screw, also referred to as leadscrew 36. The ability to provide the electromechanical strut 10 with a compact, reduced weight arrangement is provided, at least in part, by an integral electromechanical brake assembly, referred to hereafter simply as brake 38. When the brake 38 is in its normal closed position, also referred to as an "on position" or "engaged state," it provides additional holding force to maintain the power drive unit 12 and telescoping unit 16 in axially fixed or substantially fixed positions relative to one another. In contrast, when the brake 38 is selectively moved to an open position, also referred to as an "off position" or "disengaged state," the telescoping unit 16 is able to move axially relative to the power drive unit 12 to a new axial position, such as to open or close the lift gate 24 or side door of the vehicle 11, by way of example and without limitation.

In general, the electromechanical strut 10, or brake 38 of the strut 10, of the present disclosure can be used in place of, or incorporated with, respectively, the electromechanical struts disclosed in U.S. provisional patent application No. 62/083,419, filed Nov. 24, 2014; U.S. provisional patent application No. 62/109,157, filed Jan. 29, 2015; U.S. provisional patent application No. 62/204,154, filed Aug. 12, 2015; U.S. patent application Ser. No. 14/750,042, filed Jun. 15, 2015; and U.S. patent application Ser. No. 14/938,156, filed Nov. 11, 2015, which are all incorporated herein by reference in their entirety. These patent applications make clear how various components of the electromechanical strut 10 of the present disclosure function relative to one another, and how the strut 10 of the present disclosure can be incorporated into a vehicle application.

The electromechanical strut 10 shown in FIGS. 2A-2D includes several features, and elimination thereof, which contribute to the improved operation, reduced weight and compact design of the strut 10. In addition to the inclusion of the electromechanical brake 38, which provides additional desired holding force to selectively prevent relative movement between the power drive unit 12 and the telescoping unit 16, the exemplary strut 10 does away with the need for a counterbalance spring member, such as a coil spring, as is typically deployed within or about a telescoping unit of struts discussed in the background. The elimination of a counterbalance spring provides the ability to construct the electromechanical strut 10 with a reduced diameter and/or cross-sectional area, thereby allowing the weight of the strut 10 to be reduced, as a result of the minimized package size of the strut 10 and the omission of the material of the counterbalance spring, and the outer envelope to be reduced, thereby resulting in a compact design.

Figure 2A:
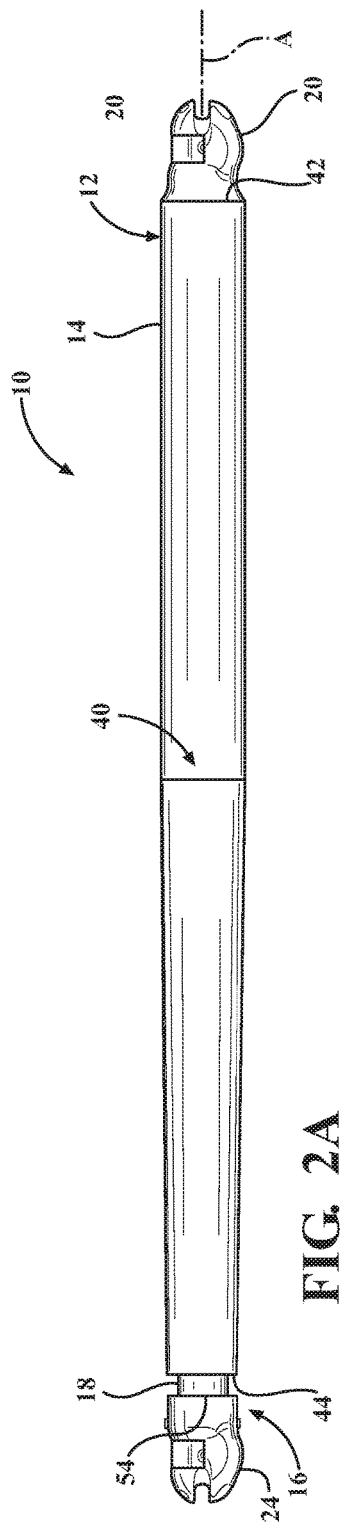
FIG. 2A is a side view of the electromechanical strut of FIG. 1 constructed in accordance one aspect of the invention.
Figure 2B:
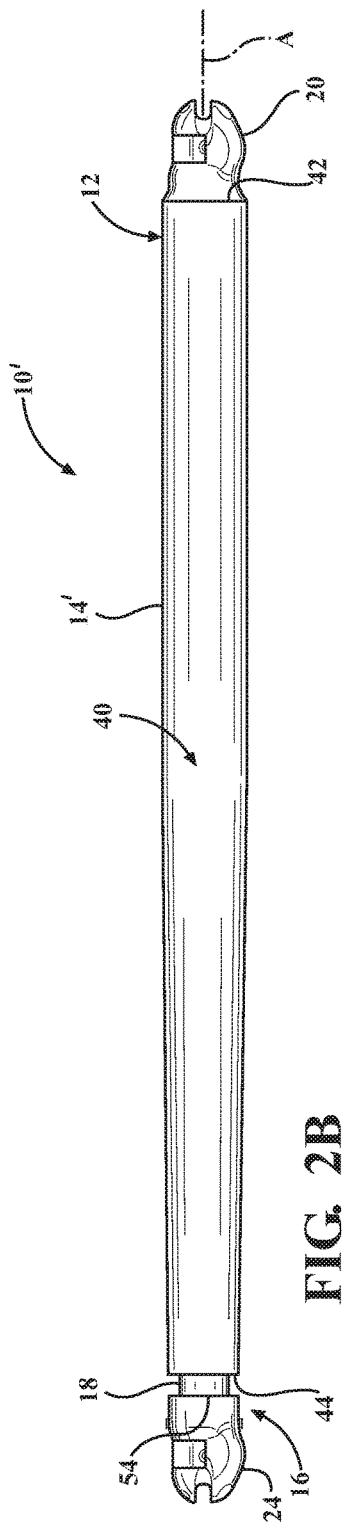
FIG. 2B is a side view of the electromechanical strut constructed in accordance another aspect of the invention.
Figure 2C:
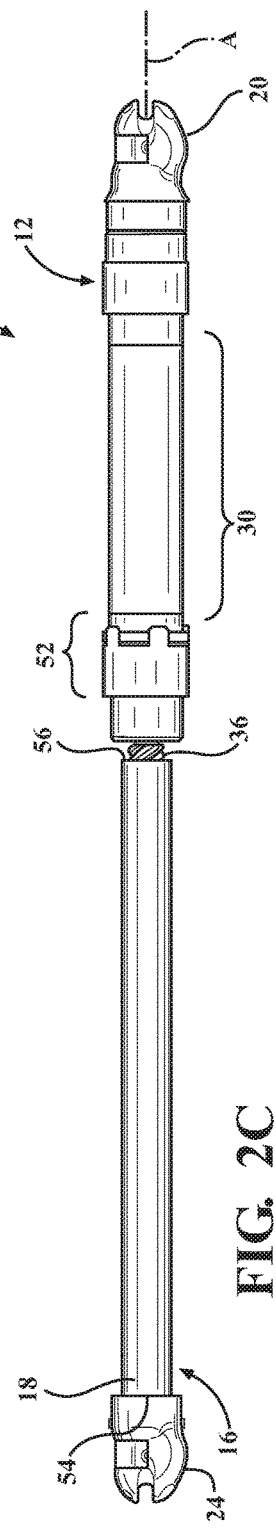
FIG. 2C is a side view of the electromechanical strut of FIGS. 2A and 2B with an outer housing removed therefrom.
Figure 2D:
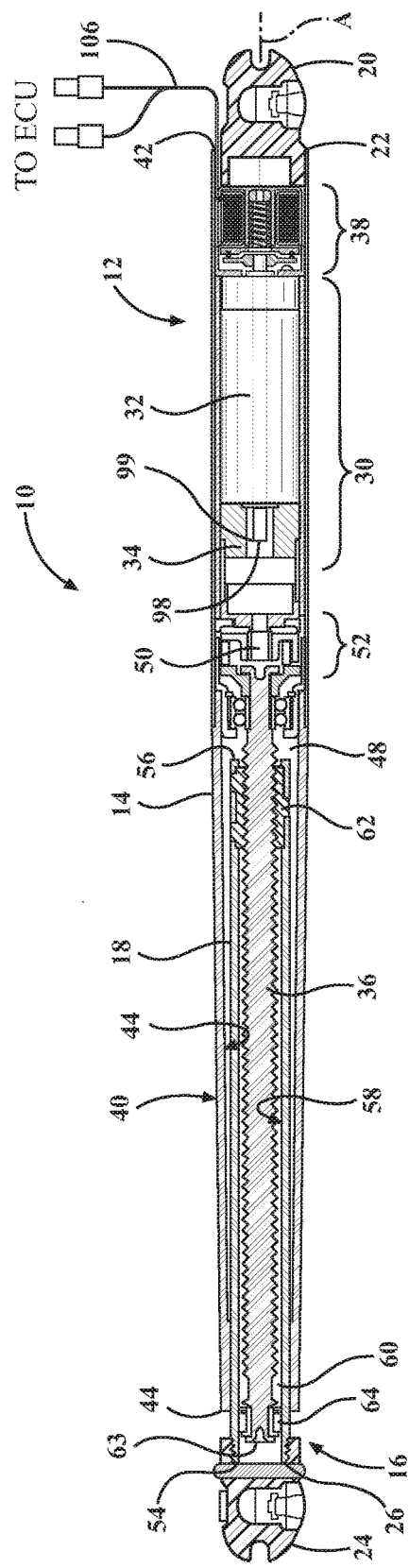
FIG. 2D is a cross-sectional view taken generally along a longitudinal central axis of the electromechanical strut of FIG. 2A.

As shown in FIGS. 2A and 2D, the outer housing 14 has a tubular wall with an outer surface 40 that extends along a longitudinal axis A between the opposing first and second ends 42, 44 and an inner surface 46 bounding a cavity or chamber 48 sized for at least partial receipt of the motor-gear assembly 30 therein. The motor 32 and planetary gearset 34 are seated within the chamber 48. The leadscrew 36 is disposed within the telescoping unit 16 and couples to an output shaft 50 of the power drive unit 12. In the illustrated embodiment, the planetary gearset 34, which is known in the art per se, provides about a 20:1 gear ratio reduction, by way of example and without limitation. The gearset 34 can be provided as described in any of the aforementioned references incorporated herein by reference, and can be provided having any desired gear ratio reduction. The power drive unit 12 features a coupling 52 that enables the power unit 12 to be quickly and easily attached with the telescoping unit 16. In the first example embodiment, the tubular wall of the outer housing 14 includes a pair of cylindrically-shaped tubes joined together, though, as shown in FIG. 2B, showing an electromechanical strut 10' constructed in accordance with another aspect of the invention, it is to be recognized a tubular wall of the housing 14' can be provided as a single tubular member, if desired, with all else being the same or substantially the same. The motor 32 and the gearset 34 are located along the axis A between the leadscrew 36 and the electromechanical brake assembly 38, such that the brake assembly 38 is disposed between the motor 32 and the first end 42 of the housing 14, and the motor 32 is disposed between the gearset 34 and the electromechanical brake assembly 38. Alternatively, the electromechanical brake assembly 38 could be mounted on the opposite side of the motor 22 and gearbox 24, if desired, as would be recognized by one skilled in the art upon viewing the disclosure herein.

The telescoping unit 16 includes the single-walled extensible tube 18 that extends along the longitudinal axis A between opposing first and second ends 54, 56 and has an inner surface 58 bounding a cavity or chamber 60 sized for clearance receipt of the leadscrew 36. One end 54 of extensible tube 18 is rigidly connected to the second pivot mount 24, such as via mating helical threads for interconnecting the parts, by way of example and without limitation.

The extensible tube 18 has a drive nut 62 fixedly mounted in its chamber 60 adjacent the second end 56 thereof, such as via press fit and/or bonded fixation therein or riveted connection, by way of example and without limitation. The drive nut 62 is threadedly coupled with the leadscrew 36 in order to convert rotational movement of the leadscrew 36 into linear motion of the telescoping unit 16 along the longitudinal central axis A of the strut 10. To facilitate guiding the telescoping unit 16 is generally concentric relation with the housing 14 along the axis A, an annular, low friction wear sleeve 64 can be fixed adjacent an end 63 of the leadscrew 36 via any suitable fixation mechanism. The wear sleeve 64 remains axially fixed in relation to the leadscrew 36 and facilitates guiding smooth axial movement of the extensible tube 18 as it translates axially in response to axial movement of the drive nut 62 along the external male threads of the leadscrew 36.

Figure 3:
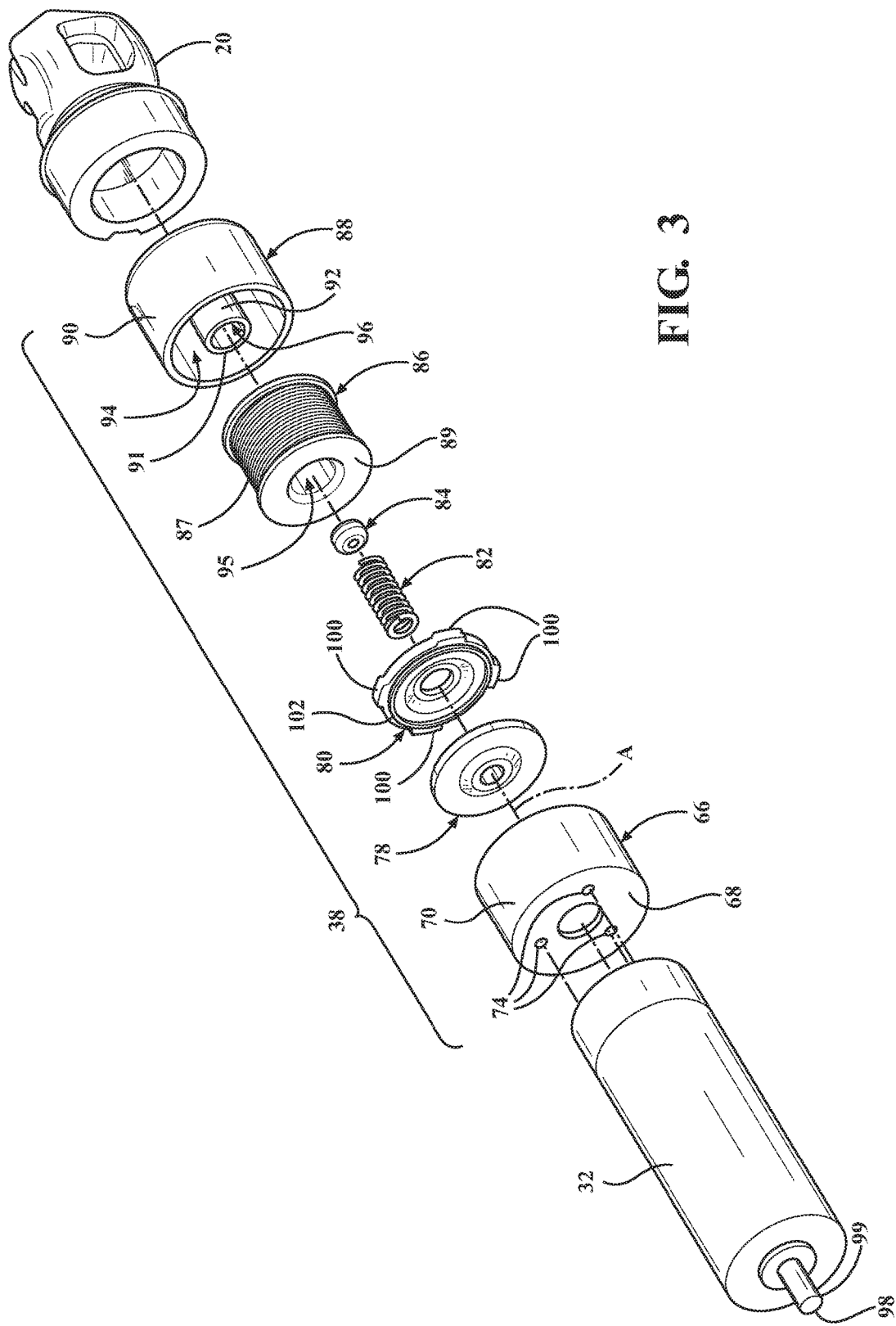
FIG. 3 is an exploded perspective view of a motor and brake assembly of the electromechanical strut of FIGS. 2A and 2B.

As best shown in the exploded view of FIG. 3, the electromechanical brake assembly 38 includes a brake housing 66 having an end mount face 68 and an annular outer wall 70, shown as being generally cylindrical and bounding an inner cavity 72 sized for substantial receipt of various components of the brake assembly 38. To facilitate fixing the brake assembly 38 in position, the end mount face 68 is shown having a plurality of through openings 74 for receipt of fasteners therethrough, wherein the fasteners can be provided as threaded fasteners 76 for threaded receipt into an end of the motor 32 (FIGS. 4A-4B), by way of example and without limitation. The brake assembly 38 further includes a first friction plate 78, also referred to as a rotating brake disc, and a second friction plate 80, also referred to as non-rotating or sliding brake disc; a spring member, shown as a coil spring 82, by way of example and without limitation; a spacer 84, also referred to as a shim; an electromagnetic coil assembly 86, such as a coil-s assembly, by way of example and without limitation, having a conductive electrical wire 87 spirally wound about a bobbin 89 and configured in operable electrical communication with a source of electric current; and a coil housing 88.

Figure 4A:
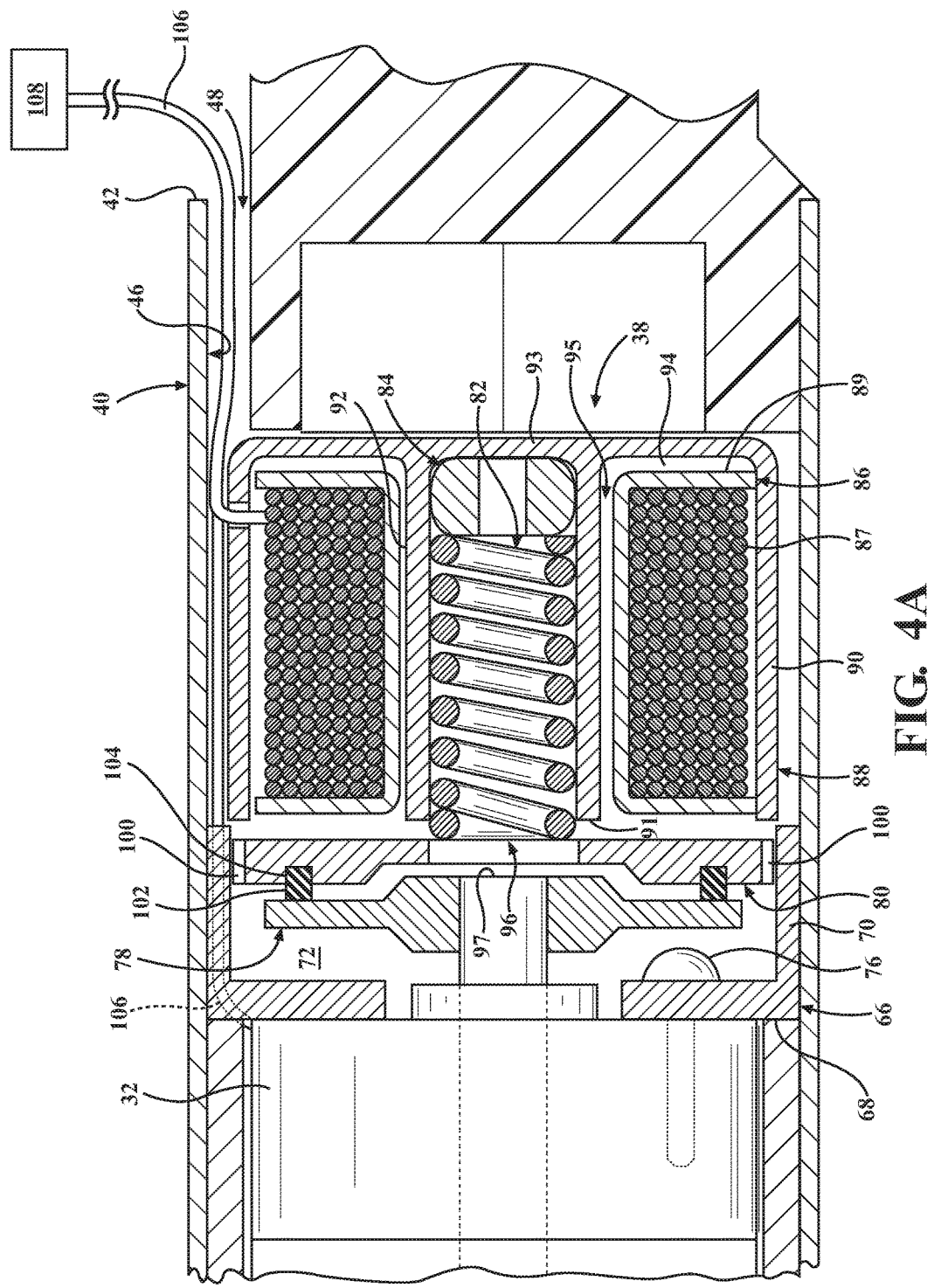
FIG. 4A is an enlarged cross-sectional side view of the brake assembly of the electromechanical strut of FIGS. 2A and 2B shown in an engaged position.
Figure 4B:
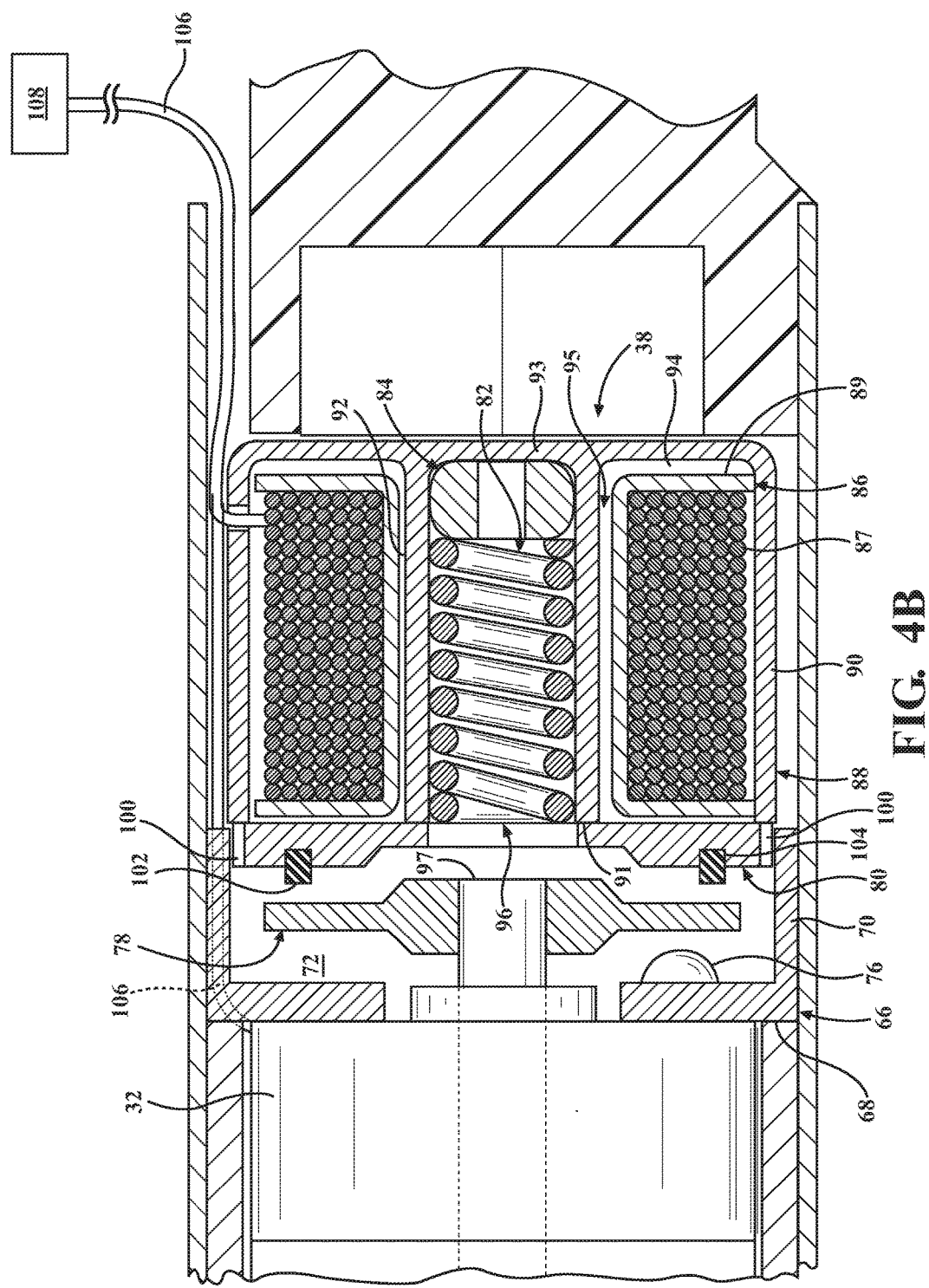
FIG. 4B is an enlarged cross-sectional side view of the brake assembly of the electromechanical strut of FIGS. 2A and 2B shown in a disengaged position.

The coil housing 88 has an annular outer wall 90 and a central, tubular post 92 extending along the axis A from an end wall 93 to a free end, with a toroid-shaped cavity 94 extending between the wall 90 and post 92 for receipt of the coil assembly 86 therein. The bobbin 89 of the coil assembly 86 has a through opening or passage 95 sized for close receipt about an outer surface of the post 92 and is sized for close receipt within the cavity 94 of the coil housing 88. As best shown in FIGS. 4A and 4B, the spacer 84 is disposed in a cavity or pocket 96 bounded by the wall of the tubular post 92, such that the spacer 84 is brought into abutment with the end wall 93. The spring member 82 is disposed in the pocket 96 against the spacer 84, wherein the spring member 82 has a length sufficient to extend axially along the axis A outwardly from and beyond a free end 91 of the tubular post 92 while in an unbiased, axially decompressed state. It should be recognized that the spacer 84 can be provided with the desired axial thickness to adjust the force of the spring member 82 applied to the second friction plate 80 by adjusting how far the spring member 82 extends axially beyond the free end 91 of the post 92, in addition to adjusting the spring constant of the spring member 82. With the brake housing 66 fixed to the motor 32 and/or the planetary gearset 34, the first friction plate 78 is operably connected for fixed attached to an end, shown as an input or first end 97 of a motor shaft 98 of the motor 32 for conjoint rotation therewith, such as via a press fit, bonded and/or fixed thereto via a mechanical fastener, by way of example and without limitation, while an opposite end, shown as an output or second end 99 of the motor shaft 98 is operably fixedly coupled with the planetary gearset 34 to operably drive the gears thereof. The second friction plate 80 is disposed in the brake housing 66 between the first friction plate 78 and the spring member 82, such that the spring member 82 engages the second friction plate 80 and forcibly biases the second friction plate 80 into contact with the first friction plate 78 upon completing assembly, and while in the "on position" or "engaged state." The second friction plate 80 is not provided for rotation movement about the axis A, but rather, for sliding movement along the axis A during movement between the "engaged" and "disengaged" states. To facilitate smooth sliding movement, the second friction plate 80 is shown as having a plurality of radially outwardly extending tabs or ears 100 for close sliding engagement with an inner surface of the brake housing outer wall 70. To facilitate establishing high frictional engagement between the first and second friction plates 78, 80 while in the "engaged state," the second friction plate 80 is shown as having a high coefficient friction material formed in shaped of an annular band 102 fixed within an annular groove 104 in an end face of the second friction plate 80. Accordingly, the annular band 102 extends axially outwardly from the end face of the second friction plate 80 for frictional engagement with an end face of the first friction plate 78 while in the "engaged state." It should be recognized that the band 102 could be fixed to the first friction plate 78, or to both the first and second friction plates 78, 80, as desired to obtain the degree of frictional engagement therebetween. It should also be recognized that any suitable high coefficient material can be used for the band 102, and further, that the end faces of the first friction plate 78 and/or the second friction plate 80 can be surface treated or otherwise roughened, as desired, to facilitate providing a high degree of friction therebetween for holding the first friction plate 78 and preventing the first friction plate 78 from rotating while in the "engaged state." One skilled in the art of braking surfaces will readily appreciate numerous mechanisms for obtaining a brake condition between the first and second friction plates 78, 80 upon viewing the disclosure herein, with those mechanisms being contemplated and incorporated herein by reference.

As shown in FIGS. 4A-4B, an electrical lead 106 extends from an electronic control unit (ECU) 108 into electrical communication with the electromechanical strut 10, and in particular, with an electronic board of the motor 32 which can include power leads and hall sensor leads and the coil assembly 86 of the electromechanical brake assembly 38. When the motor 32 and brake 38 are energized via electrical current from the lead 106, the brake 38 is moved to the "disengaged state," and the motor shaft 98 rotates about the axis A to drive the planetary gearset 34, and thus the leadscrew 36, thereby driving the drive nut 62 and extensible tube 18 axially to various positions. For example, the motor shaft 98 can drive the telescoping unit 16 to an extended position to open the lift gate or side door. The motor shaft 56 can also drive the telescoping unit 16 to a contracted position to close the lift gate or door. However, the brake 38 is normally in the "engaged state" to prevent movement of the motor shaft 56, the leadscrew 36, and thus the telescoping unit 16.

When the electromechanical brake 38 is in the "engaged state," as shown in FIG. 4A, such as when the lift gate 28 is fully closed or resting in an open position, for example, the coil assembly 86 is de-energized by the absence of electrical current supplied thereto. As such, no current or energy is provided from the ECU 108 to the coil assembly 86 of the brake 38, and thus the spring force imparted by the spring member 82 biases the second friction plate 80 into frictional contact with the first friction plate 78 to prevent the first friction plate 78, and thus the motor shaft 98, from rotating about the axis A. By preventing rotation of the motor shaft 98, the brake 38 also prevents rotational movement of the planetary gearset 34 and the leadscrew 36. Accordingly, the strut 10 maintains a fixed length extending between the first and second ends 22, 26.

To disengage the brake 38 and move the brake 38 from the "engaged state" to the "disengaged state," such as to open or close the lift gate 28 or side door of the vehicle 11, for example, a signal or command is selectively sent to the ECU 108. A user of the vehicle 11 can initiate sending a signal or command to the ECU 108 to selectively release the brake 38, and thus allow the lift gate 28 or door to be freely moved to a new position, for example to an open or closed position. A key fob, button, sensor, or any other device in the vehicle 11 or associated with the vehicle 11 can be used to send the signal to the ECU 108. Upon receiving the signal, the ECU 108 provides energy in the form of electrical current through the lead or leads 106 to the coil assembly 86 and also to the motor 32. Upon energizing the electromagnetic coil assembly 86 via electrical current flowing through the wire winding 87, a magnetic field is produced as a result of Ampere's law. The magnetic field exerts a magnetic force on the second friction plate 80, which is sufficiently strong to overcome the spring force of the spring member 82, and thus the magnetic force pulls and slides the second friction plate 80 axially away from and out of contact from the first friction plate 78. With the second friction plate 80 being axially spaced from the first friction plate 78 (FIG. 4B), the brake 38 is brought to the "disengaged state," thereby allowing the first friction plate 78, the motor shaft 98, the planetary gearset 34, and leadscrew 36 to rotate under a suitable externally applied force. As such, once the second friction plate 80 is disengaged from the first friction plate 78, the energy commanded by the ECU 108 and provided to the motor 32 causes the motor shaft 98 and the first friction plate 78 to rotate about the axis A. With the second friction plate 78 no longer being in contact with the first friction plate 80, the motor shaft 98 and first friction plate 78 are able to rotate freely about the axis A. The motor shaft 98 thusly drives the planetary gearset 34 and the leadscrew 36, which then causes the drive nut 62 and telescoping unit 16 to translate along the leadscrew 36 to the desired position. For example, if the lift gate 28 or door is closed, the motor shaft 98 can drive the leadscrew 36, thus causing the drive nut 62 and extensible tube 18 fixed thereto to move axially along the axis A to a position at which the lift gate 28 or door is opened. If the lift gate 28 or door is open, the motor shaft 98 can drive the leadscrew 36, thus causing the drive nut 62 and extensible tube 18 fixed thereto to move axially along the axis A to a position at which the lift gate 28 or door is closed. Once the lift gate 28 or door reaches the open, closed, or another predetermined position, a signal is selectively sent from ECU 108 to cease the supply of the energy through the lead 64 to the motor 32 and the coil assembly 86, thereby de-energizing the coil assembly 86, and thus causing the magnetic force from the coil assembly 86 is dissipate, thereby causing the second friction plate 80 to move under the bias of the spring member 82 into frictional engagement with the first friction plate 78. Accordingly, the brake 38 is again brought to the "engaged state" to prevent rotation of the leadscrew 36 and maintain the strut 10 in a fixed length, and thus the lift gate 28 or side door in the desired position.

The strut 10 of the present disclosure can also be operated manually. When manual operation is performed, the ECU 108 senses movement from feedback sensors provided along the strut 10 and releases the electromechanical brake 38 in the same manner as the power operation described above. If all power is lost, for example if the vehicle batteries are dead, then the braking torque is limited to a maximum allowing a slip condition. This will allow the lift gate 28 or door to be opened or closed with higher than normal manual forces.

The above-described embodiments of the invention are intended to be examples of the present invention and alterations and modifications may be effected thereto, by those of skill in the art, without departing from the spirit of the invention, which is ultimately defined by the broadest interpretation of allowed claims related to this disclosure.

What is claimed:

1. An electromechanical strut for moving a closure member of a vehicle between an open position and a closed position, the electromechanical strut comprising:
   a power drive unit operably connected to one of the closure member or a body of the vehicle, said power drive unit including a housing having an inner surface bounding a cavity extending along a central axis between opposite first and second ends, a motor fixed in said cavity and having a motor shaft extending between a first shaft end and a second shaft end, a leadscrew disposed in said cavity, a planetary gearset coupled with said first shaft end and coupled with said leadscrew such that said planetary gearset is positioned axially between said first shaft end and said leadscrew for providing a gear reduction between said motor shaft and said leadscrew, an electromechanical brake assembly coupled with said second shaft end of said motor shaft such that said brake assembly is positioned on an opposite axial side of said motor than said planetary gearset and said leadscrew;
   a telescoping unit operably connected to the other of the closure member or the body of the vehicle, said telescoping unit having an extensible tube at least partially received in said cavity through said second end of said housing and having a drive nut for converting rotary motion of said leadscrew into linear motion of said telescoping unit to move said telescoping unit between a retracted position relative to said housing and an extended position relative to said housing;
   said electromechanical brake assembly being selectively moveable between an engaged state and a disengaged state, said motor shaft and said leadscrew being prevented from rotating when said electromechanical brake assembly is in said engaged state to prevent relative axial movement between said power drive unit and said telescoping unit, said motor shaft and said leadscrew being permitted to rotate when said electromechanical brake assembly is in said disengaged state to allow relative axial movement between said power drive unit and said telescoping unit; and
   feedback sensors configured to sense movement along said electromechanical strut, and an electronic control unit electrically connected to said feedback sensors and configured to move said electromechanical brake to said disengaged state when said feedback sensors sense movement.

2. The electromechanical strut of claim 1 wherein said electromechanical brake assembly has a coil assembly operably connected to a source of electrical current, said electromechanical brake assembly remaining in said engaged state when said coil assembly is de-energized by the absence of electrical current and remaining in said disengaged state when said coil assembly is energized by electrical current.

3. The electromechanical strut of claim 2 wherein said electromechanical brake assembly includes a first friction plate and a second friction plate, said first and second friction plates being biased into frictional engagement with one another when said coil assembly is de-energized, said first and second friction plates being moved out of frictional engagement with one another by a magnetic force from said coil assembly when said coil assembly is energized.

4. The electromechanical strut of claim 3 wherein said electromechanical brake assembly includes a spring member, said spring member biasing said first and second friction plates into frictional engagement with one another when said coil assembly is de-energized.

5. The electromechanical strut of claim 3 wherein said first friction plate is fixed for conjoint rotation with said motor shaft.

6. The electromechanical strut of claim 5 wherein said second friction plate moves axially away from said first friction plate under the influence of said magnetic force.

7. The electromechanical strut of claim 6 wherein said second friction plate does not rotate.

8. The electromechanical strut of claim 2 wherein said source of electrical current is provided by an electronic control unit via an electrical lead.

9. The electromechanical strut of claim 1 wherein said extensible tube of said telescoping unit is a single walled tube.

10. The electromechanical strut of claim 1 wherein said telescoping unit does not have a counterbalance spring member.

11. An electromechanical strut for moving a closure member of a vehicle between an open position and a closed position, the electromechanical strut comprising:
    a power drive unit operably connected to one of the closure member or a body of the vehicle, said power drive unit including a housing having an inner surface bounding a cavity extending along a central axis between opposite first and second ends and a lead screw disposed in said cavity along said axis;
    a telescoping unit operably connected to the other of the closure member or the body of the vehicle, said telescoping unit having an extensible tube at least partially received in said cavity through said second end of said housing and having a drive nut fixed to said extensible tube and threadedly connected to said lead screw for converting rotary motion of said leadscrew into linear motion of said telescoping unit to move said telescoping unit between a retracted position relative to said housing and an extended position relative to said housing;
    a motor including a shaft extending between a first shaft end for driving said lead screw and a second shaft end;
    a planetary gearset coupled with said first shaft end of said motor and coupled with said lead screw such that said planetary gearset is positioned axially between said first shaft end and said lead screw for providing a gear reduction between said motor shaft and said lead screw;
    an electromechanical brake assembly coupled with said second shaft end of said motor such that said electromechanical brake assembly is positioned on an opposite axial side of said motor than said planetary gearset and said lead screw and being selectively moveable between an engaged state preventing said input shaft from rotating and relative axial movement between said power drive unit and said telescoping unit and a disengaged state permitting said input shaft to rotate allowing relative axial movement between said power drive unit and said telescoping unit; and
    feedback sensors configured to sense movement of the closure member, and an electronic control unit electrically connected to said feedback sensors and configured to move said electromechanical brake to said disengaged state when said feedback sensors sense movement of the closure member to provide for a decreased resistance of the strut during manual movement.

12. The electromechanical strut of claim 11 wherein said electromechanical brake is fixed in said cavity and includes a first friction plate rotatable about said axis by said motor and a second friction plate slidable along said axis and disposed between said first friction plate and said first end of said power drive unit.

13. The electromechanical strut of claim 12 wherein said motor is fixed in said cavity, and wherein said second shaft end is rotationally fixed to said first friction plate.

14. The electromechanical strut of claim 13 wherein said electromechanical brake assembly includes a spring member biasing said second friction plate into frictional engagement with said first friction plate.

15. The electromechanical strut of claim 14 wherein said electromechanical brake assembly has a coil assembly operably connected to a source of electrical current and including an energized state when said coil assembly is energized and moves said first and second friction plates out of frictional engagement with one another by a magnetic force to provide said disengaged state of said electromechanical brake assembly, and a de-energized state in the absence of electrical current where said first and second friction plates are biased into frictional engagement with one another by said spring member to provide said engaged state of said electromechanical brake assembly.

16. The electromechanical strut of claim 15 wherein said second friction plate includes at least one tab extending radially outwardly to prevent rotational movement.

17. The electromechanical strut of claim 16 wherein said second friction plate further includes a annular band extending axially towards said first friction plate.

18. A vehicle, comprising:
a body and a closure member moveable relative to the body between an open position and a closed position;
an electromechanical strut for moving the closure member of the vehicle between the open position and the closed position, the electromechanical strut comprising:
a power drive unit operably connected to one of the closure member or a body of the vehicle, said power drive unit including a housing having an inner surface bounding a cavity extending along a central axis between opposite first and second ends and a lead screw disposed in said cavity along said axis;
a telescoping unit operably connected to the other of the closure member or the body of the vehicle, said telescoping unit having an extensible tube at least partially received in said cavity through said second end of said housing and having a drive nut fixed to said extensible tube and threadedly connected to said lead screw for converting rotary motion of said leadscrew into linear motion of said telescoping unit to move said telescoping unit between a retracted position relative to said housing and an extended position relative to said housing;
said telescoping unit movable axially between a retracted position relative to said housing and an extended position relative to said housing;
a motor extending axially between a first end and a second end and including a shaft having a first shaft end extending from said first end of said motor and a second shaft end extending from said second end of said motor;
a planetary gearset coupled with said first shaft end of said shaft and coupled with said lead screw for providing a gear reduction between said motor shaft and said lead screw such that said planetary gearset is positioned axially between said first shaft end and said lead screw;
an electromechanical brake assembly connected to said second shaft end of said shaft such that said electromechanical brake assembly is positioned on an axially opposite side of said motor than said planetary gearset and said lead screw, said electromechanical brake assembly including a first friction plate and a second friction plate selectively moveable between an engaged state preventing rotation of said output shaft of said motor and relative axial movement between said power drive unit and said telescoping unit and a disengaged state permitting rotation of said output shaft of said motor and relative axial movement between said power drive unit and said telescoping unit; and
feedback sensors configured to sense movement of the closure member, and an electronic control unit electrically connected to said feedback sensors and configured to move said electromechanical brake to said disengaged state when said feedback sensors sense movement of the closure member to provide for a decreased resistance of the strut during manual movement.

19. The electromechanical strut of claim 18 wherein said electromechanical brake assembly has a coil assembly operably connected to a source of electrical current and including an energized state when said coil assembly is energized and moves said first and second friction plates out of frictional engagement with one another by a magnetic force to provide said engaged state of said electromechanical brake assembly, and a de-energized state in the absence of electrical current where said first and second friction plates are biased into frictional engagement with one another to provide said disengaged state of said electromechanical brake assembly.

20. The electromechanical strut of claim 19 wherein at least one of said first and second friction plates includes a plurality of tabs extending radially outwardly therefrom and positioned in circumferentially spaced relationship with one another and engaging said inner surface of said housing of said power drive unit for guiding said second friction plate during axial movement thereof.

21. The electromechanical strut of claim 19 wherein said second friction plate includes an annular band of high friction material for frictionally engaging said first friction plate.

22. The electromechanical strut of claim 1 wherein an opening is defined at said first end of said housing, and wherein at least one electrical lead extends through said opening into said cavity and is electrically connected with said motor and said electromechanical brake assembly inside said cavity.

23. The electromechanical strut of claim 1 wherein said electromechanical brake comprises a housing, and wherein said power drive unit housing and said housing of said electromechanical brake are mounted to one another.

* * * * *